(12) United States Patent
Nakada et al.

(10) Patent No.: US 6,472,012 B2
(45) Date of Patent: Oct. 29, 2002

(54) ANTIREFLECTION FILM, PROCESS FOR FORMING THE ANTIREFLECTION FILM, AND ANTIREFLECTION GLASS

(75) Inventors: Takakazu Nakada, Funabashi (JP); Kenichi Motoyama, Funabashi (JP); Rie Gunji, Funabashi (JP); Makoto Wakabayashi, Funabashi (JP); Hitoshi Furusho, Funabashi (JP); Hiroyoshi Fukuro, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 152 days.

(21) Appl. No.: 09/725,478

(22) Filed: Nov. 30, 2000

(65) Prior Publication Data

US 2001/0012565 A1 Aug. 9, 2001

(30) Foreign Application Priority Data

Dec. 14, 1999 (JP) ............................. 11-353870

(51) Int. Cl.[7] ............................. B05D 5/12; B05D 3/02; B32B 9/04; B32B 17/06
(52) U.S. Cl. .................... 427/58; 428/447; 428/451; 428/429; 427/168; 427/169; 427/387; 106/287.1; 106/287.16; 106/287.23; 106/287.34
(58) Field of Search ................. 428/429, 447, 428/451; 427/168, 169, 387, 58; 106/287.1, 287.16, 287.23, 287.34

(56) References Cited

U.S. PATENT DOCUMENTS 5,766,673 A 6/1998 Nogami et al.
5,800,925 A 9/1998 Nogami et al.

FOREIGN PATENT DOCUMENTS

| EP | 0 953 584 | 11/1999 |
| GB | 2 230 260 | 10/1990 |
| JP | 5-105424 | 4/1993 |
| JP | 6-157076 | 6/1994 |
| JP | 9-208898 | 8/1997 |
| JP | 10-259037 | 9/1998 |

OTHER PUBLICATIONS

Takashi Monde, et al., Journal of Non–Crystalline Solids, vol. 246, No. 1–2, pp. 54–64, "Preparation and Surface Properties of Silica–Gel Coating Films Containing Branched–Polyfluoroalkylsilane", Apr. 1999.

*Primary Examiner*—Deborah Jones
*Assistant Examiner*—Andrew Piziali
(74) *Attorney, Agent, or Firm*—Oblon, Spivak, McClelland, Maier & Neustadt, P.C.

(57) ABSTRACT

The present invention relates to an antireflection film effective for improving the transparency of an image display device such as a liquid crystal display (LCD), a plasma display (PDP), CRT, EL or a touch panel, to an optical product made of glass, such as a lens for eye glasses, and to an antireflection glass. The present invention is also directed to a process of coating a glass surface with a mixture comprising particular silicon compounds and thermosetting the coating film at a temperature ranging from 480 to 520° C. This process can be used to form an antireflection film on a glass surface having a refractive index ranging from 1.33 to 1.38 and a contact angle of water of at most 40 degrees.

7 Claims, No Drawings

ANTIREFLECTION FILM, PROCESS FOR FORMING THE ANTIREFLECTION FILM, AND ANTIREFLECTION GLASS

The present invention relates to an antireflection film effective for improving the transparency of an image display device such as a liquid crystal display (LCD), a plasma display (PDP), CRT, EL or a touch panel, or an optical product made of glass, such as a lens for eye glasses, and an antireflection glass. Particularly, it relates to an antireflection glass excellent in mass productivity.

A transparent substrate such as a glass substrate provided with transparent electrodes, to be used for an image display device represented by LCD, PDP, CRT, EL or a touch panel, generates a reflected light of about 4% on one side thereof, which causes deterioration in the visibility or the transmittance. Therefore, for the purpose of improving the visibility or the transmittance by reducing the amount of light reflected from the substrate, a method of forming a so-called antireflection film such as a multi-layer film prepared by laminating thin films having low reflective indices or thin films having different refractive indices, on the substrate surface, has been employed.

In general, with an antireflection film of a multi-layer structure, effective antireflection can be realized within a wide wavelength region, but it is poor in mass productivity since a technique for controlling the film thickness of each layer with high precision is required. Therefore, some thin films having low refractive indices have been proposed which can be formed by a coating method as a method for forming an antireflection film simply and conveniently.

JP-A-6-157076 proposes to prepare an antireflection film having a low refractive index by forming fine irregularities on the surface of a coating film by using, as a coating liquid, a mixture of hydrolytic condensates of alkoxysilans having different molecular weights. However, there has been a problem such that control of the irregularities on the coating film surface by controlling the relative humidity at the time of forming the coating film is difficult, or the production of the condensates having different molecular weights is conversant.

JP-A-5-105424 discloses a method of employing a coating liquid containing fine particles of $MgF_2$, but there has been a problem such that the formed coating film is poor in the mechanical strength and the adhesion to the substrate, and is further inferior in the antireflection performance.

The present inventors have previously found that by heat-treating a coating film obtained from a polysiloxane solution employing a fluoroalkylsilane, at a temperature of from 80 to 450° C., a coating film having a low refractive index and a large contact angle of water can be formed (U.S. Pat. No. 5,800,926; JP-A-9-208898). When such a coating film is formed on the surface of a display device, the large contact angle of water is a useful property as an additional function, but when it is used in the interior of the device as a highly transparent substrate, it will be essential to form another film on the surface of the coating film, and in such a case, the large contact angle of water is detrimental to the film forming on the coating film.

Therefore, a further study has been made, and as a result, it has been found that by optimizing the temperature of the heat treatment, it is possible to obtain a coating film having a small contact angle of water and a low refractive index.

Namely, it is an object of the present invention to provide an antireflection film which has a small contact angle of water and which is excellent in the antireflection performance, by a method which is capable of treating at a low cost, in a large amount and over a large area.

In a first aspect, the present invention provides a process for forming an antireflection film as adhered on a glass surface, which comprises preparing a reaction mixture comprising a silicon compound (A) of the following formula (1):

$$Si(OR)_4 \quad (1)$$

wherein R is a $C_{1-5}$ alkyl group, a silicon compound (B) of the following formula (2):

$$R^1Si(OR^2)_3 \quad (2)$$

wherein $R^1$ is a $C_{1-18}$ organic group, and $R^2$ is a $C_{1-5}$ alkyl group, an alcohol (C) of the following formula (3):

$$R^3CH_2OH \quad (3)$$

wherein $R^3$ is a hydrogen atom or an unsubstituted or substituted $C_{1-12}$ alkyl group, and oxalic acid (D), in a ratio of from 0.05 to 4.5 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid per mol of the total alkoxy groups contained in the silicon compounds (A) and (B); heating the reaction mixture at a temperature of from 50 to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; coating the polysiloxane solution on a glass surface to form a coating film; and heat-curing the coating film at a temperature of from 480 to 520° C.

In a second aspect, the present invention provides the process for forming an antireflection film according to the first aspect, wherein in the formula (2) for the silicon compound (B), the organic group represented by $R^1$ contains fluorine atoms.

In a third aspect, the present invention provides the process for forming an antireflection film according to the first aspect, wherein the formula (2) represents a silicon compound (B) of the following formula (4):

$$CF_3(CF_2)_nCH_2CH_2Si(OR^4)_3 \quad (4)$$

wherein n is an integer of from 0 to 12, and $R^4$ is a $C_{1-5}$ alkyl group.

In a fourth aspect, the present invention provides an antireflection film having a refractive index of from 1.33 to 1.38 and a contact angle of water of at most 40°, which is formed as adhered on a glass surface, by preparing a reaction mixture comprising a silicon compound (A) of the following formula (1):

$$Si(OR)_4 \quad (1)$$

wherein R is a $C_{1-5}$ alkyl group, a silicon compound (B) of the following formula (2):

$$R^1Si(OR^2)_3 \quad (2)$$

wherein $R^1$ is a $C_{1-18}$ organic group, and $R^2$ is a $C_{1-5}$ alkyl group, an alcohol (C) of the following formula (3):

$$R^3CH_2OH \quad (3)$$

wherein $R^3$ is a hydrogen atom or an unsubstituted or substituted $C_{1-12}$ alkyl group, and oxalic acid (D), in a ratio of from 0.05 to 4.5 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid per mol of the total alkoxy groups contained in the silicon compounds (A) and (B); heating the reaction mixture at a temperature of from 50 to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; coating the polysiloxane solution on a glass surface to form a coating film; and heat-curing the coating film at a temperature of from 480 to 520° C.

In a fifth aspect, the present invention provides the antireflection film according to the fourth aspect, wherein in the formula (2) for the silicon compound (B), the organic group represented by $R^1$ contains fluorine atoms.

In a sixth aspect, the present invention provides the antireflection film according to the fourth aspect, wherein the formula (2) represents a silicon compound (B) of the following formula (4):

$$CF_3(CF_2)_nCH_2CH_2Si(OR^4)_3 \qquad (4)$$

wherein n is an integer of from 0 to 12, and $R^4$ is a $C_{1-5}$ alkyl group.

In a seventh aspect, the present invention provides an antireflection glass comprising a glass and the antireflection film as defined in the fourth aspect, formed on one side or both sides of the glass.

Now, the present invention will be described in detail with reference to the preferred embodiments.

Examples of the alkyl group R in the above formula (1) include methyl, ethyl, propyl, butyl and pentyl. Preferred examples of the silicon compound (A) include tetramethoxysilane, tetraethoxysilane, tetrapropoxysilane and tetrabutoxysilane. Among them, particularly preferred are tetramethoxysilane and tetraethoxysilane.

Examples of the alkyl group $R^2$ in the above formula (2) include, methyl, ethyl, propyl, butyl and pentyl. Preferred examples of the silicon compound (B) include methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane. These compounds may be used alone or in combination as a mixture of two or more of them.

Among such preferred silicon compounds (B), particularly preferred is a fluorine-containing silane of the following Formula (4):

$$CF_3(CF_2)_nCH_2CH_2Si(OR^4)_3 \qquad (4)$$

wherein n is an integer of from 0 to 12, and $R^4$ is a $C_{1-5}$ alkyl group, such as trifluoropropyltrimethoxysilane (n=0), trifluoropropyltriethoxysilane (n=0), tridecafluorooctyltrimethoxysilane (n=5), tridecafluorooctyltriethoxysilane (n=5), heptadecafluorodecyltrimethoxysilane (n=7) or heptadecafluorodecyltriethoxysilane (n=7).

Examples of the unsubstituted alkyl group $R^3$ in the above formula (3) include methyl, ethyl, propyl, butyl, pentyl, hexyl, heptyl and octyl. Examples of the substituted alkyl group $R^3$ include hydroxymethyl, methoxymethyl, ethoxymethyl, hydroxyethyl, methoxyethyl and ethoxyethyl.

Preferred examples of the alcohol (C) include methanol, ethanol, propanol, n-butanol, ethylene glycol monomethyl ether, ethylene glycol monoethyl ether, diethylene glycol monomethyl ether, diethylene glycol monoethyl ether and propylene glycol monoethyl ether. These compounds may be used alone or in combination as a mixture of two or more of them. Among them, particularly preferred is ethanol.

The content of the silicon compound (B) is preferably from 0.05 to 4.5 mol per mol of the silicon compound (A). If the content is less than 0.05 mol, it tends to be difficult to form a coating film having a refractive index of at most 1.40, and if it exceeds 4.5 mol, it tends to be difficult to obtain a uniform solution.

The content of the alcohol (C) is preferably from 0.5 to 100 mol, particularly preferably from 1 to 50 mol, per mol of the total alkoxy groups contained in the silicon compounds (A) and (B). If the content is less than 0.5 mol, it takes a long time to form the polysiloxane, and it tends to be difficult to form a coating film having high hardness from the liquid containing the polysiloxane thereby obtained. On the other hand, if it exceeds 100 mol, the $SiO_2$ concentration in the obtained polysiloxane-containing liquid tends to be inadequate, and concentration will be required prior to coating, such being inefficient.

The content of oxalic acid (D) is preferably from 0.2 to 2 mol, particularly preferably from 0.25 to 1 mol, per mol of the total alkoxy group contained in the silicon compounds (A) and (B). If it is less than 0.2 mol, it tends to be difficult to form a coating film having high hardness from the obtained solution, and if it exceeds 2 mol, the mixture will contain a relatively large amount of oxalic acid (D), whereby it tends to be difficult to obtain a coating film having the desired performance.

The reaction mixture comprising the silicon compounds (A) and (B), the alcohol (C) and the oxalic acid (D), may be formed by mixing such components. This reaction mixture is preferably heated in the form of a solution. For example, it is preferably heated as a reaction mixture in the form of a solution obtained by preliminarily adding the oxalic acid (D) to the alcohol (C) to form an alcohol solution of oxalic acid and then mixing the silicon compounds (A) and (B) thereto. This heating can be carried out at a liquid temperature of from 50 to 180° C. and preferably carried out, for example, in a closed container or under reflux, so that no evaporation or volatilization of the liquid occurs.

If the liquid temperature at the time of forming the polysiloxane solution is lower than 50° C., the solution tends to have turbidity or tends to contain insoluble substances, whereby it tends to be a non-uniform solution. Therefore, the liquid temperature is preferably at least 50° C., and as the temperature is high, the operation can be completed in a short period of time.

However, heating at a temperature higher than 180° C. is inefficient without bringing about any additional merit. The heating time is not particularly limited. For example, it is usually about 8 hours at 50° C. and about 3 hours under reflux at 78° C. Usually, the heating is terminated when the amount of the remaining silicon compounds (A) and (B) becomes at most 5 mol %, based on the total charged amount of the silicon compounds (A) and (B). If the remaining amount exceeds 5 mol %, when such a solution is coated on a substrate surface and heat-cured, the resulting coating film tends to have pinholes, or it tends to be difficult to obtain a coating film having adequate hardness.

The polysiloxane solution obtained by the above heating, may be concentrated or diluted, as the case requires. At that time, the $SiO_2$ concentration calculated as a solid content in the polysiloxane solution is preferably from 0.5 to 15 wt %. If the $SiO_2$ concentration is lower than 0.5 wt %, it tends to be difficult to obtain a desired thickness by a single coating operation, and if it exceeds 15 wt %, the pot life of the solution tends to be inadequate.

The prepared solution is coated and heat-cured to obtain a desired coating film, by a coating method which is commonly employed. The coating film formed on the substrate (glass) may be heat-cured as it is, but before the heat-curing, it may be dried at a temperature of from room temperature to 120° C., preferably from 50 to 100° C. and then heated at a temperature of from 480 to 520° C. If the heating temperature is lower than 480° C., the contact angle of water exceeds 40°, such being undesirable. On the other hand, if it exceeds 520° C., the refractive index tends to increase beyond 1.38, whereby the coating film tends to be poor in the anti-reflection performance. Accordingly, the above-mentioned temperature range is proper in order to form a coating film which has a small contact angle of water at a level of at most 40° and a refractive index of from 1.33 to 1.38 and which is excellent in the anti-reflection performance.

The time for this heating is not particularly limited, but it is usually from 5 to 60 minutes. Such heating can be carried out by a conventional method, for example, by using a hot plate, an oven or a belt furnace.

As the above coating method, a conventional method such as a spin coating method, a dip coating method, a roll coating method or a flexoprinting method, may, for example, be usually employed.

Now, the present invention will be described in further detail with reference to Examples, but it should be understood that the present invention is by no means restricted to such specific Examples.

EXAMPLE 1

70.8 g of ethanol was charged into a four-necked flask equipped with a reflux condenser, and 12.0 g of oxalic acid was gradually added with stirring, to obtain an ethanol solution of oxalic acid.

Then, this solution was heated to its reflux temperature, and a mixed liquid comprising 11.0 g of tetraethoxysilane and 6.2 g of tridecafluorooctyltrimethoxysilane, was dropwise added thereto under reflux.

After completion of the dropwise addition, heating was continued for 5 hours under reflux, followed by cooling to obtain a polysiloxane solution (L1) having a $SiO_2$ concentration of 4 wt % as calculated as the solid content.

This solution was analyzed by gas chromatography, whereby no alkoxide monomer was detected.

EXAMPLE 2

72.4 g of ethanol was charged into a four-necked flask equipped with a reflux condenser, and 12.0 g of oxalic acid was gradually added thereto with stirring, to obtain an ethanol solution of oxalic acid.

Then, this solution was heated to its reflux temperature, and a mixed liquid comprising 12.5 g of tetraethoxysilane and 3.1 g of tridecafluorooctyltrimethoxysilane, was dripwise added thereto under reflux.

After completion of the dropwise addition, heating was carried out for 5 hours under reflux, followed by cooling to obtain a polysiloxane solution (L2) having a $SiO_2$ concentration of 4 wt % as calculated as the solid content.

This solution was analyzed by gas chromatography, whereby no alkoxide monomer was detected.

EXAMPLE 3

70.6 g of ethanol was charged into a four-necked flask equipped with a reflux condenser, and 12.0 g of oxalic acid was gradually added thereto with stirring, to obtain an ethanol solution of oxalic acid.

Then, this solution was heated to its reflux temperature, and a mixed liquid comprising 9.4 g of tetraethoxysilane, 6.2 g of tridecafluorooctyltrimethoxysilane, 1.2 g of γ-glycidoxypropyltrimethoxysilane and 0.6 g of γ-aminopropyltriethoxysilane, was dropwise added thereto under reflux. After completion of the dropwise addition, heating was carried out for 5 hours under reflux, followed by cooling to obtain a polysiloxane solution (L3) having a $SiO_2$ concentration of 4 wt % as calculated as the solid content.

This solution was analyzed by gas chromatography, whereby no alkoxide monomer was detected.

EXAMPLE 4

73.9 g of ethanol was charged into a four-necked flask equipped with a reflux condenser, and 12.0 g of oxalic acid was gradually added thereto with stirring, to obtain an ethanol solution of oxalic acid.

Then, this solution was heated to its reflux temperature, and a mixed liquid comprising 9.4 g of tetraethoxysilane, 2.9 g of trifluoropropyltrimethoxysilane, 1.2 g of γ-glycidoxypropyltrimethoxysilane and 0.6 g of γ-aminopropyltriethoxysilane, was dropwise added thereto under reflux. After completion of the dropwise addition, heating was carried out for 5 hours under reflux, followed by cooling to obtain a polysiloxane solution (L4) having a $SiO_2$ concentration of 4 wt % as calculated as the solid content.

This solution was analyzed by gas chromatography, whereby no alkoxide monomer was detected.

EXAMPLE 5

52.7 g of ethanol was charged into a four-necked flask equipped with a reflux condenser, and 20.5 g of oxalic acid was gradually added thereto with stirring, to obtain an ethanol solution of oxalic acid.

Then, this solution was heated to its reflux temperature, and a mixed liquid comprising 21.9 g of tetraethoxysilane and 4.9 g of octadecyltriethoxysilane, was dropwise added thereto under reflux. After completion of the dropwise addition, heating was carried out for 5 hours under reflux, followed by cooling to obtain a polysiloxane solution (L5) having a SiO$_2$ concentration of 7 wt % as calculated as the solid content.

This solution was analyzed by gas chromatography, whereby no alkoxide monomer was detected.

EXAMPLE 6

50.7 g of ethanol was charged into a four-necked flask equipped with a reflux condenser, and 21.6 g of oxalic acid was gradually added with stirring, to obtain an ethanol solution of oxalic acid.

Then, this solution was heated to its reflux temperature, and a mixed liquid comprising 6.3 g of tetraethoxysilane and 21.4 g of methyltriethoxysilane, was dropwise added thereto under reflux. After completion of the dropwise addition, heating was carried out for 5 hours under reflux, followed by cooling to obtain a polysiloxane solution (L6) having a SiO$_2$ concentration of 9 wt % as calculated as the solid content.

This solution was analyzed by gas chromatography, whereby no alkoxide monomer was detected.

EXAMPLE 7

64.9 g of ethanol was charged into a four-necked flask equipped with a reflux condenser, and 15.8 g of oxalic acid was gradually added thereto with stirring, to obtain an ethanol solution of oxalic acid.

Then, this solution was heated to its reflux temperature, and a mixed liquid comprising 10.4 g of tetraethoxysilane and 8.9 g of methyltriethoxysilane, was dropwise added thereto under reflux. After completion of the dropwise addition, heating was carried out for 5 hours under reflux, followed by cooling to obtain a polysiloxane solution (L7) having a SiO$_2$ concentration of 6 wt % as calculated as the solid content.

This solution was analyzed by gas chromatography, whereby no alkoxide monomer was detected.

COMPARATIVE EXAMPLE 1

Into a four-necked flask equipped with a reflux condenser, 43.7 g of ethanol, 16.6 g of tetraethoxysilane and 9.3 g of tridecafluorooctyltrimethoxysilane were charged and mixed to obtain an ethanol solution. Then, this solution was heated to its reflux temperature, and a mixed liquid comprising 24.9 g of ethanol, 5.4 g of water and 0.1 g of nitric acid, was dropwise added thereto under reflux.

After completion of the dropwise addition, heating was carried out for 5 hours under reflux, followed by cooling to obtain a polysiloxane solution (L8) having a SiO$_2$ concentration of 4 wt % as calculated as the solid content.

COMPARATIVE EXAMPLE 2

70.8 g of ethanol was charged into a four-necked flask equipped with a reflux condenser, and 12.0 g of oxalic acid was gradually added thereto with stirring, to obtain an ethanol solution of oxalic acid.

Then, this solution was heated to its reflux temperature, and 13.9 g of tetraethoxysilane was dropwise added thereto under reflux. After completion of the dropwise addition, heating was carried out for 5 hours under reflux, followed by cooling to obtain a polysiloxane solution (L9) having a SiO$_2$ concentration of 4 wt %, as calculated as the solid content.

This solution was analyzed by gas chromatography, whereby no alkoxide monomer was detected.

Each of the above solutions (L1) to (L9) was diluted with ethanol so that the SiO$_2$ concentration would be 1 wt % as calculated as the solid content, and using the diluted solution as a coating liquid, a coating film was formed on a glass by dip coating. Then, this coating film was dried in an oven at 100° C. for 10 minutes and then heated in a firing furnace at a temperature (curing temperature) as shown in Table 1, to obtain an antireflection glass. Then, with respect to the obtained coating film (antireflection film), the tensile hardness, the refractive index, the transmittance, the contact angle of water and the film thickness were measured by the following methods.

For the measurement of the refractive index, one having a coating film formed on a silicon substrate under the same conditions, was employed.

Tensile hardness: Measured in accordance with JIS K5400.

Refractive index: Using Ellipsometer DVA-36L, manufactured by Mizojiri Kagaku K.K., the refractive index at a wavelength of 633 nm was measured.

Transmittance: Using spectrophotometer UV3100PC, manufactured by Shimadzu Corporation, the spectral transmittance at from 400 to 800 nm was measured.

Contact angle of water: Using an automatic contact angle meter CA-Z model, manufactured by Kyowa Kaimen Kagaku K.K., the contact angle when 3 $\mu$l of pure water was dropped, was measured. The contact angle of water (°) is represented by a positive real number. However, by this measuring apparatus, it was impossible to obtain an accurate measured value when the contact angle of water was less than 10°.

Film thickness: The dried film was cut by a cutter, and after curing, the difference in level was measured by means of a Talystep, manufactured by Rank Taylor Hobson Company, and taken as the film thickness.

The results of these evaluations are shown in Table 1.

TABLE 1

| Ex. | Coating solution | Curing temperature (° C.) | Film thickness (nm) | Pencil hardness | Refractive index | Transmittance (%) | Contact angle of water (°) |
|---|---|---|---|---|---|---|---|
| 1 | L1 | 480 | 80 | 8H | 1.33 | 98.4 | 17 |
| 2 | L1 | 500 | 75 | 8H | 1.33 | 98.4 | 12 |
| 3 | L1 | 520 | 75 | 8H | 1.34 | 98.2 | 10 |
| 4 | L2 | 500 | 84 | 8H | 1.36 | 97.7 | 11 |
| 5 | L3 | 500 | 78 | 8H | 1.34 | 98.1 | 10 |
| 6 | L4 | 500 | 80 | 8H | 1.37 | 97.4 | 10 or less |
| 7 | L5 | 500 | 82 | 7H | 1.37 | 97.5 | 10 or less |
| 8 | L6 | 500 | 79 | 8H | 1.37 | 97.5 | 40 |
| 9 | L7 | 500 | 81 | 8H | 1.38 | 97.2 | 35 |
| 10 | L8 | 500 | 80 | 8H | 1.45 | 94.6 | 10 |
| 11 | L9 | 500 | 82 | 8H | 1.44 | 94.8 | 10 or less |
| 12 | L1 | 600 | 70 | 8H | 1.45 | 94.6 | 10 |

According to the present invention, an antireflection film excellent in the antireflection performance can be presented by a process excellent in the productivity. The antireflection glass thereby obtained is useful for high transparency of various displays such as LCD, PDP and touch panels.

The entire disclosure of Japanese Patent Application No. 11-353870 filed on Dec. 14, 1999 including specification, claims, drawings and summary are incorporated herein by reference in its entirety.

What is claimed is:

1. A process for forming an antireflection film as adhered on a glass surface, which comprises preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$R^1Si(OR^2)_3 \qquad (2)$$

wherein $R^1$ is a $C_{1-18}$ organic group, and $R^2$ is a $C_{1-5}$ alkyl group, an alcohol (C) of the following formula (3):

$$R^3CH_2OH \qquad (3)$$

wherein $R^3$ is a hydrogen atom or an unsubstituted or substituted $C_{1-12}$ alkyl group, and oxalic acid (D), in a ratio of from 0.05 to 4.5 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid per mol of the total alkoxy groups contained in the silicon compounds (A) and (B); heating the reaction mixture at a temperature of from 50 to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; coating the polysiloxane solution on a glass surface to form a coating film; and heat-curing the coating film at a temperature of from 480 to 520° C.

2. The process for forming an antireflection film according to claim 1, wherein in the formula (2) for the silicon compound (B), the organic group represented by $R^1$ contains fluorine atoms.

3. The process for forming an antireflection film according to claim 1, wherein the formula (2) represents a silicon compound (B) of the following formula (4):

$$CF_3(CF_2)_nCH_2CH_2Si(OR^4)_3 \qquad (4)$$

wherein n is an integer of from 0 to 12, and $R^4$ is a $C_{1-5}$ alkyl group.

4. An antireflection film having a refractive index of from 1.33 to 1.38 and a contact angle of water of at most 40°, which is formed as adhered on a glass surface, by preparing a reaction mixture comprising a silicon compound (A) of the following formula (1):

$$Si(OR)_4 \qquad (1)$$

wherein R is a $C_{1-5}$ alkyl group, a silicon compound (B) of the following formula (2):

$$R^1Si(OR^2)_3 \qquad (2)$$

wherein $R^1$ is a $C_{1-18}$ organic group, and $R^2$ is a $C_{1-5}$ alkyl group, an alcohol (C) of the following formula (3):

$$R^3CH_2OH \qquad (3)$$

wherein $R^3$ is a hydrogen atom or an unsubstituted or substituted $C_{1-12}$ alkyl group, and oxalic acid (D), in a ratio of from 0.05 to 4.5 mol of the silicon compound (B) per mol of the silicon compound (A), in a ratio of from 0.5 to 100 mol of the alcohol (C) per mol of the total alkoxy groups contained in the silicon compounds (A) and (B), and in a ratio of from 0.2 to 2 mol of the oxalic acid per mol of the total alkoxy groups contained in the silicon compounds (A) and (B); heating the reaction mixture at a temperature of from 50 to 180° C. until the total amount of the silicon compounds (A) and (B) remaining in the reaction mixture becomes at most 5 mol %, while maintaining a $SiO_2$ concentration of from 0.5 to 10 wt % as calculated from silicon atoms in the reaction mixture and maintaining absence of water, to form a polysiloxane solution; coating the polysiloxane solution on a glass surface to form a coating film; and heat-curing the coating film at a temperature of from 480 to 520° C.

5. The antireflection film according to claim 4, wherein in the formula (2) for the silicon compound (B), the organic group represented by $R^1$ contains fluorine atoms.

6. The antireflection film according to claim 4, wherein the formula (2) represents a silicon compound (B) of the following formula (4):

$$CF_3(CF_2)_nCH_2CH_2Si(OR^4)_3 \qquad (4)$$

wherein n is an integer of from 0 to 12, and $R^4$ is a $C_{1-5}$ alkyl group.

7. An antireflection glass comprising a glass and the antireflection film as defined in claim 4, formed on one side or both sides of the glass.

* * * * *